(12) United States Patent
Sen et al.

(10) Patent No.: US 12,238,357 B2
(45) Date of Patent: *Feb. 25, 2025

(54) ADAPTIVE BITRATE VIDEO TESTING FROM SCREEN RECORDING

(71) Applicants: AT&T Intellectual Property I, L.P., Atlanta, GA (US); AT&T Mobility II LLC, Atlanta, GA (US)

(72) Inventors: Subhabrata Sen, Westfield, NJ (US); Eric Petajan, Watchung, NJ (US); Shichang Xu, Ann Arbor, MI (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 389 days.

This patent is subject to a terminal disclaimer.

(21) Appl. No.: 17/657,949

(22) Filed: Apr. 4, 2022

(65) Prior Publication Data

US 2022/0232275 A1 Jul. 21, 2022

Related U.S. Application Data

(63) Continuation of application No. 16/713,389, filed on Dec. 13, 2019, now Pat. No. 11,297,365.

(51) Int. Cl.
*H04N 21/2662* (2011.01)
*H04N 19/10* (2014.01)
(Continued)

(52) U.S. Cl.
CPC ......... *H04N 21/2662* (2013.01); *H04N 19/10* (2014.11); *H04N 19/154* (2014.11);
(Continued)

(58) Field of Classification Search
None
See application file for complete search history.

(56) References Cited

U.S. PATENT DOCUMENTS 5,894,324 A 4/1999 Overton
8,782,727 B1 * 7/2014 Nagarajan ........ H04N 21/44209
725/120
(Continued)

FOREIGN PATENT DOCUMENTS

CN 103731664 B 4/2014
EP 2227031 A2 * 9/2010 ........... H04N 17/004

OTHER PUBLICATIONS

Shichang Xu, et al., "What You See Is What You Get: Measure ABR Video Streaming QoE via On-device Screen Recording" Jun. 10, 2020, pp. 1-7, NOSSDAV'20, Istanbul, Turkey, ACM ISBN 978-1-4503-7945-8/20/06, https://doi.org/10.1145/3386290.3396938.

*Primary Examiner* — Shadan E Haghani

(57) ABSTRACT

A processing system may obtain a downscaled version of a reference copy of a video, comprising a plurality of downscaled versions of a plurality of frames of the reference copy of the video, obtain a first recorded frame of a first variant of a plurality of variants associated with the reference copy of the video, where the plurality of variants comprises a plurality of copies of the video encoded at different bitrates, generate a first downscaled version of the first recorded frame, calculate a first plurality of image distances between the first downscaled version of the first recorded frame and the plurality of downscaled versions of the plurality of frames of the reference copy of the video, and determine a first frame index of the first recorded frame in accordance with a first least image distance from among the first plurality of image distances that is calculated.

20 Claims, 5 Drawing Sheets

(51) Int. Cl.
  *H04N 19/154* (2014.01)
  *H04N 21/232* (2011.01)
  *H04N 21/2343* (2011.01)
  *H04N 21/236* (2011.01)
  *H04N 21/24* (2011.01)

(52) U.S. Cl.
  CPC ..... *H04N 21/232* (2013.01); *H04N 21/23439* (2013.01); *H04N 21/236* (2013.01); *H04N 21/2402* (2013.01)

(56) References Cited

U.S. PATENT DOCUMENTS

| | | | |
|---|---|---|---|
| 2008/0253689 A1* | 10/2008 | Ferguson | H04N 17/00 382/294 |
| 2011/0169963 A1* | 7/2011 | Winkler | G06T 7/38 348/180 |
| 2015/0023404 A1* | 1/2015 | Li | H04L 65/612 375/240.02 |
| 2016/0105728 A1 | 4/2016 | Schmidmer et al. | |
| 2017/0078715 A1 | 3/2017 | Chao | |
| 2017/0186147 A1* | 6/2017 | He | H04L 67/535 |
| 2017/0372142 A1* | 12/2017 | Bilobrov | H04N 21/2187 |

\* cited by examiner

```
Function AlignFrame(refImages, recImages)
    Input: The reference frame images refImages
           The recorded frames images recImages
    Result: The original frame indexes of the recorded frames
            idxs
    // Generate the signature for refImages.
    refSigs ← array of len(refImages);
    for i = 0 to len(refImages) do
        refSigs[i] ← generateSignature(refImages[i]);
    end
    lastIdx ← 0;
    for recordedIdx = 0 to len(recImages) do
        recSig ←
         generateSignature(recImages[recordedIdx]);
        // Find the most similar reference frame.
        closestDiff ← inf;
        for j = lastIdx - window to lastIdx + window do
            diff ← sum(absdiff(recSig, refSigs[j]));
            if diff < closestDiff then
                closestDiff ← diff;
                closestIdx ← j;
            end
        end
        originalIdxs(recordedIdx) ← closestIdx;
        lastIdx ← closestIdx;
    end
end
Function generateSignature(image)
    return resize(image, thumbnailSize)
end
```

ADAPTIVE BITRATE VIDEO TESTING FROM SCREEN RECORDING

This application is a continuation of U.S. patent application Ser. No. 16/713,389, filed on Dec. 13, 2019, now U.S. Pat. No. 11,297,365, which is herein incorporated by reference in its entirety.

The present disclosure relates generally to adaptive bitrate streaming videos, and more particularly to devices, non-transitory computer-readable media, and methods for testing adaptive bitrate video streaming of non-annotated videos.

BRIEF DESCRIPTION OF THE DRAWINGS

The teachings of the present disclosure can be readily understood by considering the following detailed description in conjunction with the accompanying drawings, in which:

FIG. 2 illustrates an example of computing code for a frame alignment process for adaptive bitrate video streaming of an non-annotated video, in accordance with the present disclosure;

To facilitate understanding, identical reference numerals have been used, where possible, to designate identical elements that are common to the figures.

DETAILED DESCRIPTION

Figure 1:
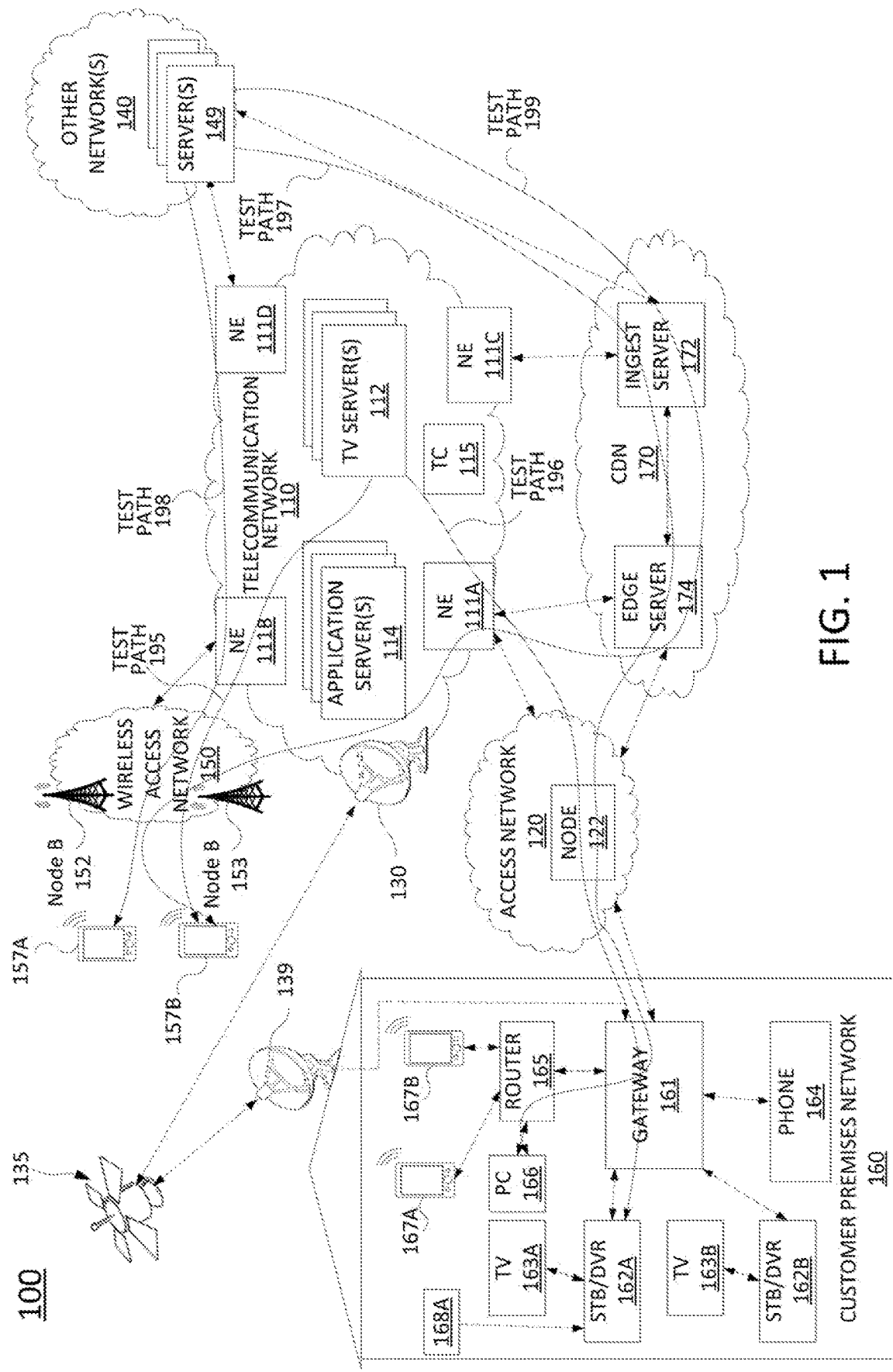
FIG. 1 illustrates an example system related to the present disclosure.

In one example, the present disclosure describes a device, non-transitory computer-readable medium, and method for testing adaptive bitrate video streaming of non-annotated videos. For instance, a processing system including at least one processor may obtain a downscaled version of a reference copy of a video, comprising a plurality of downscaled versions of a plurality of frames of the reference copy of the video, obtain a first recorded frame of a first variant of a plurality of variants associated with the reference copy of the video, where the plurality of variants comprises a plurality of copies of the video encoded at different bitrates, and generate a first downscaled version of the first recorded frame. The processing system may further calculate a first plurality of image distances between the first downscaled version of the first recorded frame and the plurality of downscaled versions of the plurality of frames of the reference copy of the video, and determine a first frame index of the first recorded frame in accordance with a first least image distance from among the first plurality of image distances that is calculated.

Video delivery technology has shifted from protocols such as Real Time Messaging Protocol (RTMP) and Real Time Streaming Protocol (RTSP) to Hypertext Transfer Protocol (HTTP)-based, adaptive streaming protocols, such as Moving Picture Experts Group (MPEG) Dynamic Adaptive Streaming over HTTP (DASH). A feature of HTTP-based adaptive streaming protocols is the availability of video in multiple chunks associated with each time block of a video and having different encoding bitrates, with the chunks linked together by a manifest file, or "index file" that defines all of the variants/tracks (e.g., respective sets of chunks, each set at a different bitrate/encoding level) of the video.

In one example, a video chunk (broadly a "chunk") may comprise a sequence of video and/or audio frames for a time block of a video that is encoded at a particular bitrate (e.g., a target bitrate, or "encoding level"). In one example, a chunk may be referred to as a segment, when the chunks of an adaptive bitrate video are stored as individual data files separate from other chunks. In such an example, the chunk (e.g., a segment) may be obtained by a requesting device, such as a player device, via a uniform resource locator (URL) identifying a file containing the chunk. In another example, a chunk may be stored and/or made available as a portion of a file which may contain multiple chunks or even an entire variant/track. In addition, such a chunk may be obtained via a URL identifying the file containing the chunk and a byte range, timestamp, index, sequence number, or the like to distinguish the chunk from other chunks in the same file. The URL(s) and other information that may be used by a player device to request and obtain chunks of an adaptive bitrate video may be stored in a manifest file which may be obtained by the player device in advance of a streaming session.

A time block of an adaptive bitrate video may have multiple associated chunks at respective bitrates. In particular, each of these associated chunks may be of a respective variant for the video. In addition, each variant may comprise a set of chunks encoded at a same bitrate (e.g., a target bitrate) and covering successive time blocks so as to constitute a complete copy of the video at the (target) bitrate for that variant. The time blocks may have a duration that is defined in advance in accordance with an adaptive bitrate protocol and/or set according to a preference of a video player vendor, a video service provider, a network operator, a video creator, a transcoder vendor, and so forth. In one example, chunks may be associated with particular time blocks of a video via sequence numbers, index numbers/indices, or the like which indicate a relative (temporal) order of the time blocks within the overall video. For instance, time block indicators for each available chunk may be included in the manifest file so that a player device may determine which chunks may be requested for each time block and so that the player device may determine which chunk(s) to request next (e.g., for successive time blocks).

A variety of factors may affect users' quality of experience for video streaming. These include video stalls, startup delay, and poor video/audio quality. Adaptive bitrate (ABR) streaming over HTTP is adopted since it offers significant advantages in terms of both user-perceived quality and resource utilization efficiency for content and network service providers. Unlike video downloads that must be completed fully before playback can begin, streaming video starts playing within seconds. With ABR-based streaming, each video is encoded at a number of different quality levels (called variants) and stored on servers as separate files. A video client running on a mobile device, home television, game console, web browser, etc. chooses which quality level to stream by monitoring network conditions and estimating the available network capacity.

The function of the ABR algorithm is to select ABR variants, or "bitrate variants" (called representations in DASH) in real time to maximize video quality and minimize re-buffering events. Typically, a video client maintains a media cache (also referred to as a "buffer" or "video buffer"), by pre-fetching video chunks, then playback occurs from the cache. For each time block of a video-on-demand (VoD) program/live channel, the video client selects which variant from which to download a chunk into the cache. Higher quality chunks for a given time block are larger in size (data volume) and take longer to download than lower quality chunks. In general, the goal is to download as high a quality chunk as possible each time while keeping the buffer from going empty.

One approach to variant or chunk selection is channel capacity estimation, which uses chunk download time as an estimate of available channel bitrate. The video client selects a chunk of a variant having a bitrate/encoding level that most closely matches the channel bitrate without exceeding it. In an environment where throughput is highly variable, such as a mobile network, accurate estimation of future channel capacity is challenging.

Another approach uses a current buffer level (e.g., a measure of an amount of time of video stored in the buffer to be played out), instead of estimated channel bandwidth, to select the bitrate/encoding level of the next chunk. As with capacity estimation, the objective is to balance the flow of data into the buffer with the outflow, to keep the buffer from going empty or overflowing. Unlike with channel capacity estimation, for buffer occupancy-based approach, the actual buffer level is used to select the next chunk, e.g., with a linear, or approximately linear, mapping function. The higher the current buffer level, the higher the bitrate selected for the next chunk for the next time block, and vice versa: the lower the buffer level, the lower the variant bitrate selected for the next chunk. This ensures conservative behavior, e.g., selecting minimum quality/chunk data volume, when the buffer is low, i.e., filling the buffer more quickly using a chunk of a lower bitrate variant and aggressive behavior, e.g., selecting maximum quality/chunk data volume, when the buffer is full or nearly so, i.e., filling the buffer more slowly using a chunk of a higher bitrate variant. In response to bandwidth drops and/or buffer depletion, a client may request a chunk for the same time block at a lower quality level (lower bitrate variant) and may discard the partially downloaded chunk, which results in bandwidth waste. This also increases the chance of playback stalls, and leads to a lower average bitrate of the chunks downloaded and more frequent quality switches.

A measure for how efficiently an ABR video stream is delivered and for the quality in which the stream is being presented on the screen of a device can be referred to as a "Quality of Experience" (QoE). If the video quality of an ABR video stream is too high (e.g., maximum spatial resolution, frame rate, etc.), then delivery quality may suffer (e.g., increased video startup time, frequency and duration of stalls during playback to allow for buffering, etc.). As such, network service providers that provide and/or facilitate delivery of ABR video streams seek to balance video quality with delivery quality, thereby mitigating waste of network resources while maintaining a QoE that is acceptable to the user. In one example, QoE monitoring and testing may utilize comparisons between a video stream received at a video player device and a source video and/or a reference video to be used as a baseline for QoE analysis. In accordance with the present disclosure, a reference video may comprise the source video or may comprise a copy of the source video that may be modified (e.g., for color correction/enhancement, noise reduction, compression, etc.) or that may be unmodified.

For entities with access to the player source code, white-box testing techniques could be used to configure the code to generate logs on how the system behaves. However, entities without source code access may also desire to perform video QoE measurements for various reasons. For example, Internet Service Providers (ISPs) may attempt to understand how well popular ABR streaming services perform on their networks. Similarly, third-party testing services may be asked to evaluate how an ABR streaming system works. In addition, application developers may use closed-source third-party player source development kits (SDKs) to build their video players and may hope to know the corresponding performance. However, performing ABR video QoE measurements in such scenarios is challenging, since video player source code may be proprietary and may not readily expose QoE information. Various test entities may therefore resort to black-box techniques. Existing black-box measurement techniques may rely on network traffic analysis, but are less applicable with wide adoption of traffic encryption.

In contrast, examples of the present disclosure detect streaming QoE based on the displayed video content from the screen recording for any general ABR videos, without the need for special patterns embedded in the videos (e.g., non-annotated videos without a frame number and/or a track/variant identifier embedded or overlaid on each frame). Conceptually the displayed content is what users observe and should accurately reflect user QoE. As just one example, the present disclosure may allow a mobile network operator to measure the expected QoE when users watch a popular video via an over-the-top streaming service, without access to the content servers or the video player code at the user endpoints.

In accordance with the present disclosure a test of ABR video streaming of a particular ABR video at a video player/test device may involve obtaining before an actual test run: (1) a reference version of the video, e.g., a high-quality version of the video (such as the highest quality track/version of the video that is available, and which, in one example, may have been used to encode the separate lesser quality tracks/variants), and (2) the tracks/variants, e.g., the segments/chunks comprising media files of the separate encoded tracks. Such materials can be obtained via different approaches. For instance, for a specific video player and/or endpoint device to be tested, if the tester has control to play content via user-provided uniform resource locators (URLs), the tester can encode the tracks from a high-quality source video and play the stream for testing. In another example, for many services, there exist tools to download the segments/chunks of specific tracks/variants of the video (e.g., youtube-dl for YouTube, FBDOWN.net for Facebook Video, and clipr for Twitch). In still another example, the tester can work with video providers to obtain these materials for the specific test video. After obtaining the reference copy of the video and the different tracks/variants, the tester may stream the ABR video under an interested network condition and record the screen display on the video player device/test device. As referred to herein, the "generated video" may comprise the recorded video as recorded via screen capture at the video player device. It should be noted that during playback, the displayed segments could be a mixture of multiple tracks and potentially have stalls. The tester can later analyze the streaming QoE including stall durations and displayed track distribution from the recorded video as described herein.

In one example, the present disclosure may include three processes: (1) frame alignment: each recorded frame in the recorded video is aligned via the reference copy of the video to determine the original frame index (e.g., frame number)

of the recorded frame; (2) stall detection: stalls are analyzed from the aligned frame index sequence; (3) track detection: image distances of each recorded frame in the recorded video with respective corresponding frames in the source video are compared with similar image distances for screen recorded frames of various tracks/variants to detect the track of each screen recorded segment (and/or each frame within a screen recorded segment). Examples of the present disclosure may measure streaming QoE with high accuracy. For instance, in experimental runs, 93.1% of stalls were accurately detected, while the maximum error across all runs in stall detection was found to be 500 ms. In addition, with a recording bitrate of 5 Mbps, more than 95% of experimental runs achieves a track detection accuracy higher than 95%. Notably, screen recording may introduce distortion in the recorded video compared with the displayed video, e.g., compression artifacts and color space distortions. In addition, testing has determined that the recording distortion is not simply eliminated by increasing the recording bitrate. To illustrate, it has been found that recording a track with an average Video Multimethod Assessment Fusion (VMAF) value of 76.9 using a recording bitrate as high as 20 Mbps may still result in an average VMAF value of 41.2 for the track, as recorded via screen capture. Examples of the present disclosure are robust to these distortions introduced via screen recording, and thus may be used to analyze the streaming QoE, including detecting stalls and performing track detection.

Notably, the occurrence of stalls causes interruption to users and negatively impacts user experience. Longer stall duration causes lower QoE. A common QoE metric is total stall duration during playback. In addition, the number of stall occurrences and the time when they occur is also related to user experience. With the same total stall duration, more frequent stalls cause higher impairment of user experience. In addition, streaming video tracks with poor quality leads to poor QoE. One metric to characterize the video quality is average bitrate. However, the average bitrate metric does not account for the fact that streaming low-quality tracks has a disproportionately larger negative impact on QoE. Consider two cases where the first case shows 144p video for half of the duration and 1080p for the other half, while the second case shows 720p video during the whole playback. Even though the average bitrate may be the same, the user experience for the first case is worse, since users are more sensitive to the quality impairment in low-quality tracks. Thus, another metric, which may be more useful than average bitrate, is the distribution of played tracks. Another useful metric is track switching rate. For instance, frequent track switches degrade user experience. In addition, users are more sensitive to switches between non-adjacent tracks (e.g., jumping more than one available quality level up or down). Thus, to measure QoE more accurately, it may be more beneficial to obtain fine-grained information on the playback including the start time and end time of each stall, the tracks played across time, etc. instead of only using coarse-grained information such as average bitrate.

There are some existing black-box testing techniques to obtain the streaming QoE information without access to the player source code, including HTTP parsing, machine learning (ML) classification and optical character recognition (OCR) analysis. However, such techniques may suffer from various limitations. For instance, with HTTP parsing, the HTTP request URLs and headers in the network traffic are analyzed to determine the tracks of the downloaded segments across time. Combining with buffer emulation by computing the total downloaded segments duration, stalls may be inferred. However, such emulation could be inaccurate since the playback process involves complex behaviors and the time overhead of processes, such as decoding and rendering, may not be inferred from network traffic. In addition, the emulation relies on buffer models with player specific parameters, such as the minimal buffer occupancy when the playback begins, which are challenging to obtain accurately. In addition, some players could download segments with the same index from different tracks, which may necessitate making assumptions on which segments are eventually displayed.

For encrypted video streams, the HTTP request information may be unavailable without decrypting the traffic payload, making the existing HTTP analysis techniques less relevant and useful. There are some machine learning (ML)-based techniques to predict video QoE from traffic characteristics such as network throughput, latency, etc. However, the predicted QoE information is coarse-grained qualitative results, typically only a binary decision on whether the QoE is good or not. It does not give information on the individual stalls or displayed tracks.

Some services may provide special video patterns which embed frame and track number information in each frame. Some other services may provide special modes that display streaming track information on the screen. Testers can record the screen and use OCR techniques to extract such information to compute the QoE. However, such approaches may only work for the few specific videos or services with such support and may not be generalized. In contrast, examples of the present disclosure analyze the streaming QoE from screen recording of playback of non-annotated ABR videos (e.g., without specific frame and/or variant labels for each frame). Examples of the present disclosure therefore do not require access to HTTP request information, do not need to make inferences via analysis of encrypted traffic, and do not need to use specialized videos with markers/annotations provided thereon.

As noted above, the present disclosure utilizes screen recording at a video player device as the basis for ABR video streaming testing (e.g., measuring ABR video streaming QoE). Although the present disclosure may include a description of techniques in connection with a particular computing system/computing environment (e.g., Android operating system (OS)), it should be understood that examples of the present disclosure are equally applicable to any computing system/environment that may be used in connection with ABR video streaming. In an illustrative example, the Android system supports screen recording functionality for applications and provides two classes for screen recording: MediaProjection and MediaRecorder. To record the displayed content on the screen, applications may first use the application programming interface (API) MediaProjection.createVirtualDisplay to mirror the screen to a virtual display, then use MediaRecorder to record and encode the displayed content into video files. Underlying the application framework, Android uses a native media engine called Stagefright that implements some built-in software based codecs to encode the video. Stagefright can also integrate hardware-based codecs as OpenMax Integration Layer components when available. The MediaRecorder parameters may be adjusted to tune the recording quality. In particular, various recording bitrates can be configured using the API setVideoEncodingBitRate. A higher bitrate indicates potentially better quality. Note that the actually achieved bitrate of the generated video may not be exactly the same as the configured value. If the encoder on the device cannot support the configured bitrate given the hardware resource constraints, the recorded video may be of lower bitrate.

Regardless of the recording bitrate and regardless of the quality of the original track, it has been found that the screen recording process may introduce distortions compared to the original played video. In particular, the average VMAF value of the recorded frames has been found to be lower than the average VMAF value of the track frames, regardless of the recording bitrate. Although it has been found that by increasing the recording bitrate, compression artifacts can be reduced (thereby improving the recorded quality), this does not similarly help reduce the color space distortion. Thus, the recording video quality may not be reliably used to represent the quality of the original played video. In addition to the degradation of the video quality, screen recording can also drop some frames, where the drop rate may be independent of the recording bitrate.

As noted above, examples of the present disclosure provide a process that may include frame alignment, stall detection, and/or track detection, which are now described in greater detail as follows.

Frame Alignment—In one example, a recorded video is first converted into a frame sequence with a same constant frame rate as the reference video. For instance, a unified frame rate may ensure that the elapsed time between consecutive recorded frames is the same as the playback time between consecutive reference frames. This may also render the frame alignment results easier to analyze for stall detection. Since recorded frames can be from one of the ABR tracks which have different levels of compression artifacts compared with reference frames, to perform frame alignment, the present disclosure provides a frame-index-specific signature that is similar for frames across different tracks at the same index, but is substantially different for frames with a different index. In one example, downscaled versions of frames are used for comparison, e.g., frame thumbnails which are low-resolution images scaled-down from the frames. For instance, it has been determined that among all frames in a reference video, the thumbnail of a frame from any track is nearly always the most similar to the thumbnail of the reference frame with the same original frame index. In one example, the thumbnails created from the frames of the original, or reference copy of the video, and the thumbnails generated from screen-recorded frames may be downscaled to a same size, e.g., 160×90 pixels, or the like. In one example, the difference between two thumbnails is computed as the sum of the absolute difference between each pixel in them. In one example, the image distance (e.g., the difference between the thumbnails) may comprise an average pixel distance.

To reduce potential errors and improve the search speed, in one example, the alignment result of the last recorded frame is used to reduce the search space among the reference frames using a moving window centered on the detected original index of the last recorded frame. During playback without stalls, if the last recorded frame is aligned correctly with the original frame index i, the original index of the next recorded frame should be i+1. However, in practice there may be errors in the last alignment result. In addition, there may be stalls or the recording might drop frames as mentioned above. The moving window provides robustness against these situations. For example, the detection error of the last frame does not cause subsequent errors as long as the error is smaller than the search window. An example, of computing code 200 (e.g., pseudocode) for a frame alignment process for adaptive bitrate video streaming of an non-annotated video is illustrated in FIG. 2.

Stall Detection—After frame alignment (determining the original index of each recorded frame), the present disclosure may then determine the occurrences, and the start and end times of stalls. A simple approach is to detect the stall whenever the frame indexes of consecutive recorded frames (as determined via the frame alignment process) do not increase by 1. Such an approach may work well if all frames are aligned perfectly. However, this simplified approach is sensitive to any mistakes in the alignment. Specifically, whenever a frame is misaligned (e.g., the frame index is not strictly in an ascending sequence from the previous frame), a stall is detected. However, if the frame alignment process misdetects the frame index, it is not necessarily the case that a stall occurred. The present stall detection technique is able to handle the occasional errors in frame alignment and detect stalls correctly based on the majority correct alignment results. To illustrate, in one example, the present disclosure may (1) extract the longest increasing index subsequence from the frame alignment results to filter out likely outliers, and (2) combine results from multiple frames to determine the occurrence of stalls.

The longest increasing subsequence is defined as a subsequence (of a sequence of elements) where the elements are sorted from the lowest to highest and the subsequence is as long as possible. Frames that are not in the longest increasing subsequence are filtered out. Examples of extracting longest increasing subsequences and determining stalls therefrom are illustrated in FIG. 3.

Figure 3:
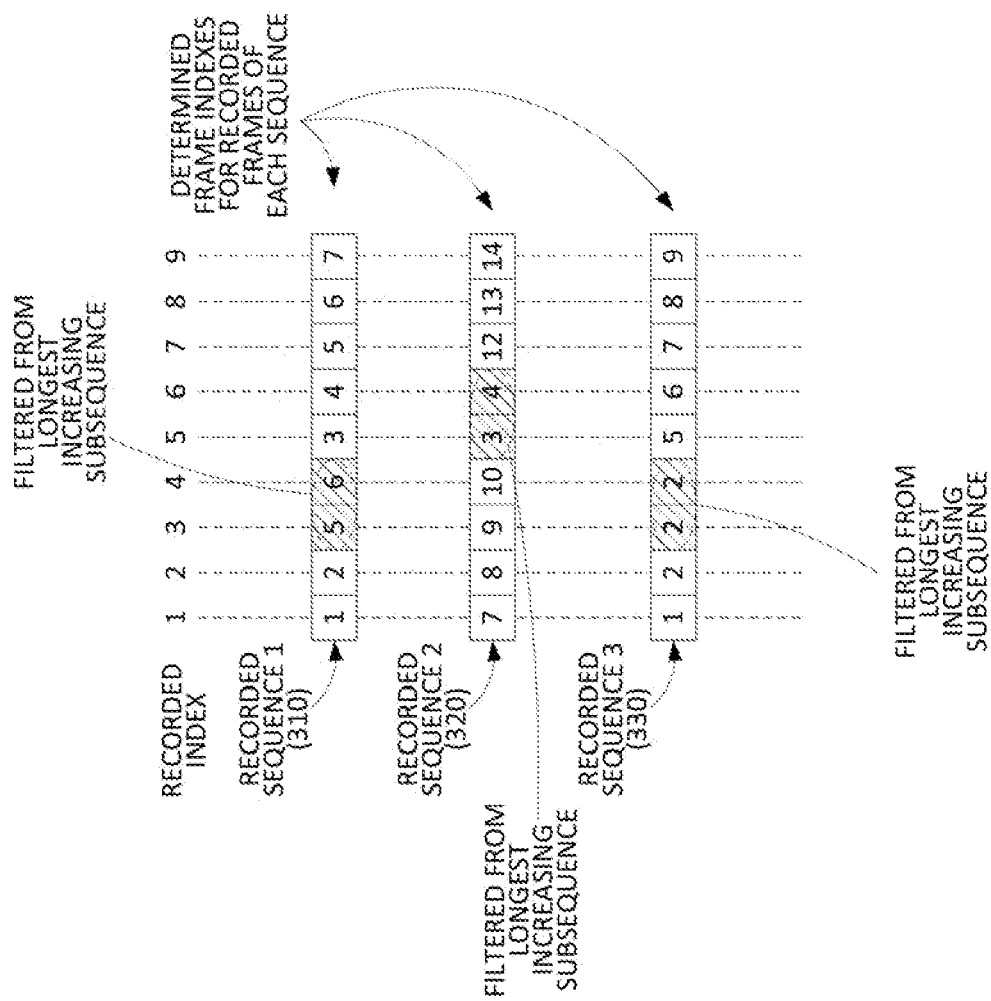
FIG. 3 illustrates examples of stall detection for adaptive bitrate video streaming of an non-annotated video, in accordance with the present disclosure.

For instance, as shown in FIG. 3, in a first sequence (310), the 3th and 4th recorded frames (original frame indexes detected as 5 and 6, respectively) will be filtered out from the longest increasing subsequence; otherwise, the 4th to 7th recorded frames (original frame indexes detected as 3, 4, 5 and 6, respectively) would need to be removed, resulting in shorter subsequence. The longest increasing subsequence helps filter out the misaligned frames since the original frame indexes during playback should only increase; decreasing in frame index is not possible. In addition, in one example, it is assumed that the majority of alignment results should be accepted as correct. Thus, based on the majority alignment results, the inconsistent results may be detected and removed. Accordingly, the longest increasing subsequence effectively removes the misaligned frames.

It should be noted that when there are consecutive duplicate frames and multiple longest subsequences exists, the one with the lowest element index may be selected. For instance, in the third sequence (330) shown in FIG. 3, removing any of the 2nd to 4th frames results in a longest increasing subsequence. However, in one example, the longest increasing subsequence with the 2nd frame is preferred. For example, the occurrence of duplicate indexes in a sequence may be caused by a slow-motion scene. The detection of the first frame in that scene may be detected correctly due to a scene change, but later frames may be misaligned to the first frame as there is not much change between frames. In such a case, the longest increasing subsequence with the smallest recorded frame indexes may give the highest accuracy.

In one example, after extracting the longest increasing subsequence, what remains is a sequence of recorded frame indexes and the corresponding original frame indexes. In one example, for each recorded frame, the present disclosure may compute the offset between the recorded frame index and original frame index. An increase of this offset between two consecutive recorded frames of the longest increasing subsequence indicates that the original frame index pauses growing during the period, i.e., a stall occurs. For instance, in the second sequence (320) shown in FIG. 3, the $5^{th}$ and $6^{th}$ frames are filtered out of the longest increasing subsequence. Then, for the $1^{st}$ to $4^{th}$ recorded frames, the offsets between the determined frame indexes and the recorded indexes remains steady at 6. However, for the $7^{th}$ recorded frame (next in the longest increasing subsequence after the $4^{th}$ recorded frame), the offset between the determined frame index (12) and the recorded index (7) is 5. The change in the offset from 6 to 5 indicates an occurrence of a stall. Note that the stall may be determined to be only one frame, since the change in the offset is only 1. In this case, since two frames were filtered out of the longest increasing subsequence, it may be determined that one of the two frames filtered out had the original frame index misdetected (but did not constitute part of the stall).

To further illustrate, the first sequence (310) may also be determined to exhibit a stall. For instance, for the $1^{st}$ and $2^{nd}$ recorded frames, the offsets between the determined frame indexes and the recorded indexes remains consistent at zero (0). However, for the $5^{th}$ recorded frame (next in the longest increasing subsequence after the $2^{th}$ recorded frame), the offset between the determined frame index (3) and the recorded index (5) is −2. The change in the offset from zero to −2 indicates an occurrence of a stall (of two frames duration). On the other hand, the third sequence (330) may be determined to not exhibit a stall. In particular, for the $1^{st}$ and $2^{nd}$ recorded frames, the offsets between the determined frame indexes and the recorded indexes remains consistent at zero (0). In addition, for the $5^{th}$ recorded frame (next in the longest increasing subsequence after the $2^{th}$ recorded frame), the offset between the determined frame index (5) and the recorded index (5) remains zero (0). Thus, it may be determined that no stall occurred. However, since the $3^{rd}$ and $4^{th}$ recorded frames were filtered out of the longest increasing subsequence, it may be concluded that these recorded frames were misaligned (e.g., the original frame indexes were incorrectly determined).

To further reduce detection errors caused by occasional misalignment, in one example, the present disclosure checks the next 10 frames and ensures the majority of them confirm the increase of this offset. For instance, at least half of the next 10 frames should exhibit an increase in the offset, in which case, a stall may be declared. Otherwise, no stall may be recorded (e.g., there may still be false stall detection, or if there is a stall but it is less than 10 frames, such a stall may go unnoticed by a user and thus have little to no effect on the overall QoE).

Track Detection—In one example, the present disclosure may alternatively or additionally determine the tracks/variants of each recorded frame (and may further quantify a track distribution and/or track switches) after performing frame alignment. For frames with the same index, the image distance between the track with the best quality and the reference video may always or nearly always be smaller than the image distance between the track with worst quality and the reference video. In addition, the image distance varies for each frame in a track, e.g., depending on the content. In one example, for a given video, the present disclosure builds a distance table which includes the image distance of each frame of each track to the corresponding frame of a reference copy of the video for each frame index. When analyzing a recorded frame (after performing frame alignment to determine the original frame index of the recorded frame), the present disclosure may compute the image distance between the recorded frame and the corresponding frame of the reference copy of the video having the same frame index. The present disclosure may then refer to the distance table for the specific frame index and find the most similar image distance among all tracks to the image distance calculated for the recorded frame. The corresponding track is recognized as the track to which the recorded frame belongs.

It should be noted that in one example, the distance table may use image distances calculated for screen-recorded frames of the various tracks instead of the original track frames. For instance, such a distance table may account for screen recording distortions, which may significantly change the image distance to the reference. To illustrate, in an example where a 720 pixel track was recorded with recording bitrates of 5 Mbps and 20 Mbps and image distances were calculated to corresponding frames of a reference copy of the video, the average image distance between the recorded frames to the reference was found to be significantly larger than the average image distance between the original frames of the 720p track to the corresponding frames of the reference. In addition, with a recording bitrate of 5 Mbps, the average image distance of recorded frames of the 720p track to corresponding frames of the reference video was even larger than the average image distance between frames of an original 480p track of the video to corresponding frames of the reference. In this case, the track detection recognized the recorded frames as being from the 480p track while they were actually from the 720p track.

In one example, frames of separate tracks of a test video may be screen-recorded once, a distance table may be built, and then the distance table may be reused for a number of test runs. It should be noted that the distance table may be built by the same device via which the test run(s) will occur, or may be built by a different device (e.g., a video player device of a same make and model as the test device, or one that is similar to the test device, etc.) and provided to the test device for use in testing. As long as the recording distortion for the same bitrate setting is stable across different runs, this distance table may be used to detect the recordings of other arbitrary playbacks (e.g., having the same settings).

In one example, the detected track information for different recorded frames may be further combined to improve accuracy. For instance, since track switches typically occur at the segment boundaries, for frames within each segment (which can be a few seconds long) the track should be the same. Thus in one example, the present disclosure may aggregate the calculated tracks/variants for each frame within a segment, find the most frequent result, and set this as the result for the segment (and/or all frames within the segment). It should be noted that some ABR player devices and/or ABR streaming systems support track switching during the playback of a segment, but even in such systems, overall this may be an infrequent occurrence. Nevertheless, the detected track selection for a segment based upon majority-rule may be omitted in cases where the present disclosure is used in connection with such systems.

It should be noted that certain aspects of the present disclosure may have been verified using annotated videos for benchmarking purposes. However, with the efficacy of the present techniques having been established, examples of the present disclosure may be practically implemented within any existing HAS system. In particular, examples of the present disclosure may be advantageously deployed for ABR video streaming testing where the tester does not control the streaming architecture, does not control the relevant video player code of endpoint devices, etc., and therefore may not be able to annotate videos for testing.

In addition, although examples of the present disclosure are primarily described in connection with streaming content (e.g., Video-on-Demand (VOD) content), examples of the present disclosure may also be applied to live streaming as well. For example, to obtain screen recorded frames of separate tracks of the video, the multiple tracks may be downloaded and screen-recorded via multiple devices simultaneously. The results may then be used to calculate image distances, create a table, correlate the images distances with image distances of recorded frames of a test device, and so forth.

To further aid in understanding the present disclosure, FIG. 1 illustrates an example system 100 (e.g., comprising one or more networks) in which examples of the present disclosure may operate. As shown in FIG. 1, the system 100 connects mobile devices 157A, 157B, 167A and 167B, and home network devices such as home gateway 161, set-top boxes (STBs) 162A and 162B, television (TV) 163A and TV 163B, phone 164, router 165, personal computer (PC) 166, and so forth, with one another and with various other devices via a telecommunication network 110, a wireless access network 150 (e.g., a cellular network), an access network 120, other networks 140, content distribution network (CDN) 170, and/or the Internet in general. For instance, connections between telecommunication network 110, access network 120, customer premises network 160 (e.g., a home network, an enterprise network, etc.), CDN 170, wireless access network 150 and other networks 140 may comprise the Internet in general, internal links under the control of a single telecommunication service provider network, links between peer networks, and so forth.

In one example, wireless access network 150 may comprise a radio access network implementing such technologies as: Global System for Mobile Communication (GSM), e.g., a Base Station Subsystem (BSS), or IS-95, a Universal Mobile Telecommunications System (UMTS) network employing Wideband Code Division Multiple Access (WCDMA), or a CDMA3000 network, among others. In other words, wireless access network 150 may comprise an access network in accordance with any "second generation" (2G), "third generation" (3G), "fourth generation" (4G), Long Term Evolution (LTE), "fifth generation" (5G) or any other yet to be developed future wireless/cellular network technology. While the present disclosure is not limited to any particular type of wireless access network, in the illustrative example, wireless access network 150 is shown as a UMTS terrestrial radio access network (UTRAN) subsystem. Thus, elements 152 and 153 may each comprise a Node B or evolved Node B (eNodeB). In one example, wireless access network 150 may be controlled and/or operated by a same entity as telecommunication network 110.

In one example, each of the mobile devices 157A, 157B, 167A, and 167B may comprise any subscriber/customer endpoint device configured for wireless communication such as a laptop computer, a Wi-Fi device, a Personal Digital Assistant (PDA), a mobile phone, a smartphone, an email device, a computing tablet, a messaging device, and the like. In one example, any one or more of mobile devices 157A, 157B, 167A, and 167B may have both cellular and non-cellular access capabilities and may further have wired communication and networking capabilities. In one example, any one or more of mobile devices 157A, 157B, 167A, and 167B may comprise a test device (e.g., a receiver device/video player device) for performing various operations in connection with examples of the present disclosure for testing adaptive bitrate video streaming of non-annotated videos.

As illustrated in FIG. 1, system 100 includes a telecommunication network 110. In one example, telecommunication network 110 may combine core network components of a cellular network with components of a triple play service network; where triple play services include telephone services, Internet or data services and television services to subscribers. For example, telecommunication network 110 may functionally comprise a fixed mobile convergence (FMC) network, e.g., an IP Multimedia Subsystem (IMS) network. In addition, telecommunication network 110 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Telecommunication network 110 may also further comprise a broadcast television network, e.g., a traditional cable provider network or an Internet Protocol Television (IPTV) network, as well as an Internet Service Provider (ISP) network. The network elements 111A-111D may serve as gateway servers or edge routers to interconnect the telecommunication network 110 with other networks 140, wireless access network 150, access network 120, and so forth. As shown in FIG. 1, telecommunication network 110 may also include a plurality of television (TV) servers 112, and a plurality of application servers 114.

In accordance with the present disclosure, telecommunication network 110 may also include a test controller (TC) 115 (e.g., a processing system comprising one or more servers) configured to perform various operations in connection with examples of the present disclosure for testing adaptive bitrate video streaming of non-annotated videos. In one example, test controller 115 may comprise all or a portion of a computing device or processing system, such as computing system 500, and/or hardware processor element 502 as described in connection with FIG. 5 below, specifically configured to perform various steps, functions, and/or operations in connection with examples of the present disclosure for testing adaptive bitrate video streaming of non-annotated videos, as described herein. The functionality of test controller 115 is described in greater detail below in connection with test systems that may include various test devices, ABR video source devices, and so forth.

With respect to television service provider functions, telecommunication network 110 may include one or more television servers 112 for the delivery of television content, e.g., a broadcast server, a cable head-end, and so forth. For example, telecommunication network 110 may comprise a video super hub office, a video hub office and/or a service office/central office. In this regard, television servers 112 may include content server(s) to store scheduled television broadcast content for a number of television channels, video-on-demand (VoD) programming, local programming content, and so forth. Alternatively, or in addition, content providers may stream various contents to the telecommunication network 110 for distribution to various subscribers, e.g., for live content, such as news programming, sporting events, and the like. Television servers 112 may also include advertising server(s) to store a number of advertisements that can be selected for presentation to viewers, e.g., in the customer premises network 160 and at other downstream viewing locations. For example, advertisers may upload various advertising content to the telecommunication network 110 to be distributed to various viewers. Television servers 112 may also include interactive TV/video-on-demand (VoD) server(s) and/or network-based digital video recorder (DVR) servers, as described in greater detail below.

In one example, the access network 120 may comprise a Digital Subscriber Line (DSL) network, a broadband cable access network, a Local Area Network (LAN), a cellular or wireless access network, a $3^{rd}$ party network, and the like.

For example, the operator of telecommunication network 110 may provide a cable television service, an IPTV service, or any other types of television service to subscribers via access network 120. In this regard, access network 120 may include a node 122, e.g., a mini-fiber node (MFN), a video-ready access device (VRAD) or the like. However, in another example, node 122 may be omitted, e.g., for fiber-to-the-premises (FTTP) installations. Access network 120 may also transmit and receive communications between customer premises network 160 and telecommunication network 110 relating to voice telephone calls, communications with web servers via other networks 140, content distribution network (CDN) 170 and/or the Internet in general, and so forth. In another example, access network 120 may be operated by a different entity from telecommunication network 110, e.g., an Internet service provider (ISP) network.

Alternatively, or in addition, the system 100 may provide television services to customer premises network 160 via satellite broadcast. For instance, ground station 130 may receive television content from television servers 112 for uplink transmission to satellite 135. Accordingly, satellite 135 may receive television content from ground station 130 and may broadcast the television content to satellite receiver 139, e.g., a satellite link terrestrial antenna (including satellite dishes and antennas for downlink communications, or for both downlink and uplink communications), as well as to satellite receivers of other subscribers within a coverage area of satellite 135. In one example, satellite 135 may be controlled and/or operated by a same network service provider as the telecommunication network 110. In another example, satellite 135 may be controlled and/or operated by a different entity and may carry television broadcast signals on behalf of the telecommunication network 110.

As illustrated in FIG. 1, telecommunication network 110 may include various application servers 114. For instance, application servers 114 may be implemented to provide certain functions or features, e.g., a Serving-Call Session Control Function (S-CSCF), a Proxy-Call Session Control Function (P-CSCF), or an Interrogating-Call Session Control Function (I-CSCF), one or more billing servers for billing one or more services, including cellular data and telephony services, wire-line phone services, Internet access services, and television services. Application servers 114 may also include a Home Subscriber Server/Home Location Register (HSS/HLR) for tracking cellular subscriber device location and other functions. An HSS refers to a network element residing in the control plane of an IMS network that acts as a central repository of all customer specific authorizations, service profiles, preferences, etc. Application servers 114 may also include an IMS media server (MS) for handling and terminating media streams to provide services such as announcements, bridges, and Interactive Voice Response (IVR) messages for VoIP and cellular service applications. The MS may also interact with customers for media session management. In addition, application servers 114 may also include a presence server, e.g., for detecting a presence of a user. For example, the presence server may determine the physical location of a user or whether the user is "present" for the purpose of a subscribed service, e.g., online for a chatting service and the like. In one example, application servers 114 may include data storage servers to receive and store manifest files regarding adaptive bitrate streaming videos maintained within TV servers 112 and/or available to subscribers of telecommunication network 110 and stored in server(s) 149 in other networks 140. It should be noted that the foregoing are only several examples of the types of relevant application servers 114 that may be included in telecommunication network 110 for storing information relevant to providing various services to subscribers. For ease of illustration, various additional elements of telecommunication network 110 are omitted from FIG. 1.

In accordance with the present disclosure, other networks 140 and servers 149 may comprise networks and devices of various content providers of ABR videos. In one example, each of servers 149 may also make available manifest files which describe the variants of a video and the video chunks, or segments, thereof which are stored on the respective one of the servers 149. For instance, there may be several video chunks containing video and audio for the same time block (e.g., a 2-10 second portion) of the video, but which are encoded at different bitrates in accordance with an adaptive bitrate streaming protocol. Thus, an adaptive bitrate streaming video player may request and obtain any one of the different video chunks for the time block, e.g., depending upon a state of a video buffer of the adaptive bitrate streaming video player, depending upon a network bandwidth or other network conditions, depending upon the access rights of the adaptive bitrate streaming video player to different variants (e.g., to different encoding levels/bitrates) according to a subscription plan and/or for the particular video, and so forth. In one example, an adaptive bitrate streaming video player (e.g., of a test device/video player device) may also select video chunks of different variants for various time blocks of a video (which may also include video chunks of a master or reference copy of the video) based upon specific instructions from test controller 115 or in accordance with a specific configuration for testing purposes.

In one example, customer premises network 160 may include a gateway 161, which receives data/communications associated with different types of media, e.g., television, phone, and Internet, and separates these communications for the appropriate devices. The data/communications may be received via access network 120 and/or via satellite receiver 139, for instance. In one example, television data is forwarded to set-top boxes (STBs)/digital video recorders (DVRs) 162A and 162B to be decoded, recorded, and/or forwarded to television (TV) 163A and TV 163B for presentation. Similarly, telephone data is sent to and received from phone 164; Internet communications are sent to and received from router 165, which may be capable of both wired and/or wireless communication. In turn, router 165 receives data from and sends data to the appropriate devices, e.g., personal computer (PC) 166, mobile devices 167A, and 167B, and so forth. In one example, router 165 may further communicate with TV (broadly a display) 163A and/or 163B, e.g., where one or both of the televisions comprise a smart TV. In one example, router 165 may comprise a wired Ethernet router and/or an Institute for Electrical and Electronics Engineers (IEEE) 802.11 (Wi-Fi) router, and may communicate with respective devices in customer premises network 160 via wired and/or wireless connections.

In one example, STB/DVR 162A and STB/DVR 162B may comprise adaptive bitrate streaming video players capable of playing adaptive bitrate streaming videos in formats such as H.264 (Advanced Video Coding (AVC)), H.265 (High Efficiency Video Coding (HEVC)), Moving Picture Expert Group (MPEG) .mpeg files, .mov files, .mp4 files, .3gp files, .f4f files, .m3u8 files, or the like. Although STB/DVR 162A and STB/DVR 162B are illustrated and described as integrated devices with both STB and DVR functions, in other, further, and different examples, STB/ DVR 162A and/or STB/DVR 162B may comprise separate STB and DVR devices.

Figure 4:
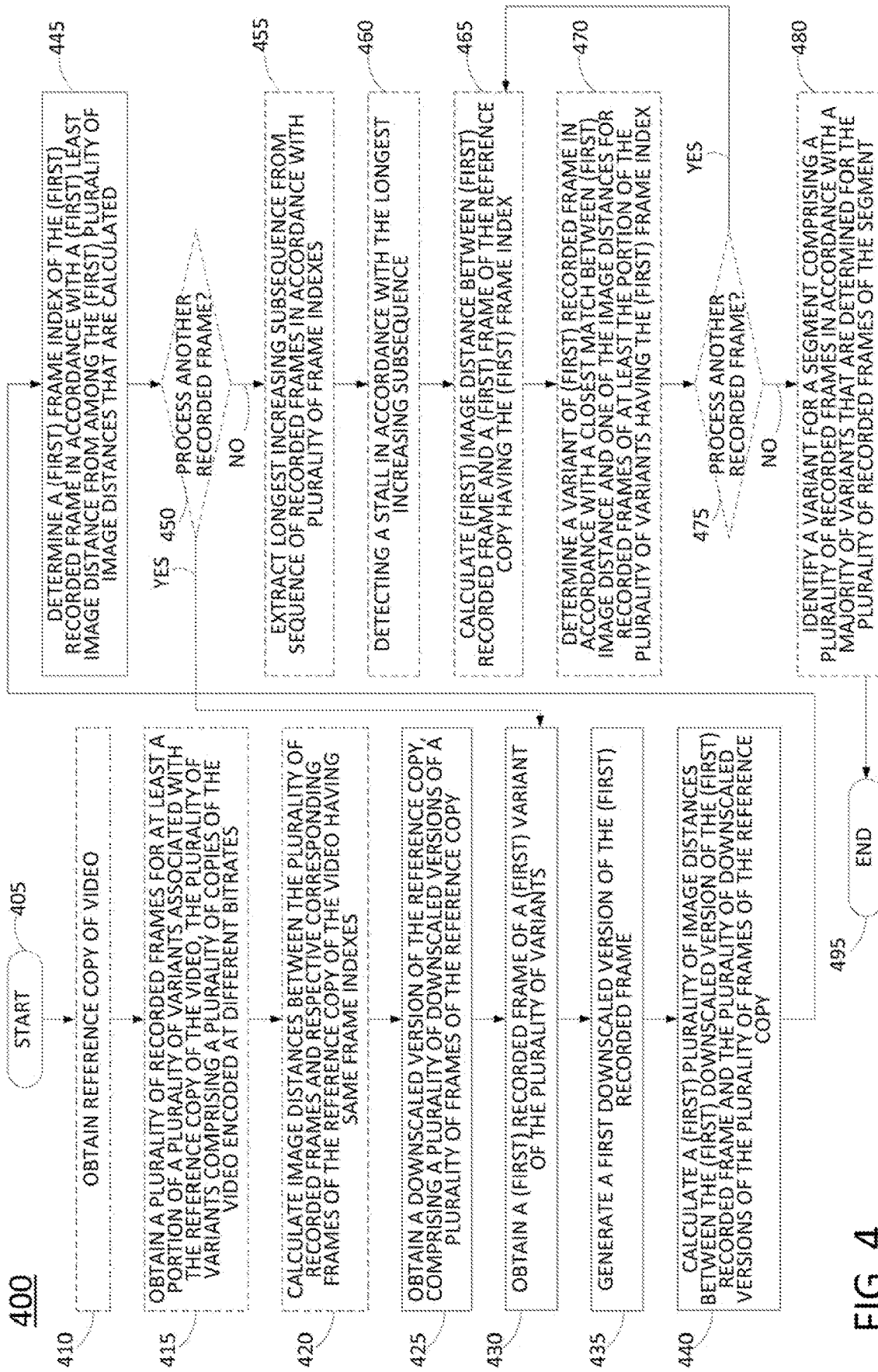
FIG. 4 illustrates a flowchart of an example method for testing adaptive bitrate video streaming of an non-annotated video, in accordance with the present disclosure.

One or more of mobile devices 157A, 157B, 167A, and 167B, TVs 163A and 163B, and/or PC 166 may also comprise all or a portion of a computing device or processing system, such as computing system 500, and/or hardware processor element 502 as described in connection with FIG. 5 below, specifically configured to perform various steps, functions, and/or operations for testing adaptive bitrate video streaming of non-annotated videos, as described herein. Among other functions, mobile devices 157A, 157B, 167A, and 167B, TVs 163A and 163B, and/or PC 166 may comprise adaptive bitrate streaming video players capable of playing adaptive bitrate streaming videos. In addition, mobile devices 157A, 157B, 167A, and 167B, TVs 163A and 163B, and/or PC 166 may each comprise a test device (e.g., a receiver device/video player device) for performing various operations in connection with examples of the present disclosure for testing adaptive bitrate video streaming of non-annotated videos. An example method 400 for testing adaptive bitrate video streaming of a non-annotated video is illustrated in FIG. 4 and discussed below.

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device, or computing system, including one or more processors, or cores (e.g., as illustrated in FIG. 5 and discussed below) or multiple computing devices collectively configured to perform various steps, functions, and/or operations in accordance with the present disclosure.

System 100 may also include a content distribution network (CDN) 170. In one example, CDN 170 may be operated by a different entity from telecommunication network 110. In another example, CDN 170 may be operated by a same entity as telecommunication network 110, e.g., a telecommunication service provider. In one example, the CDN 170 may comprise a collection of cache servers distributed across a large geographical area and organized in a tier structure. The first tier may comprise a group of servers that accesses content web servers (e.g., origin servers) to pull content into the CDN 170, referred to as ingestion servers, e.g., ingest server 172. The content may include videos, content of various webpages, electronic documents, video games, etc. A last tier may comprise cache servers which deliver content to end user, referred to as edge caches, or edge servers, e.g., edge server 174. For ease of illustration, a single ingest server 172 and a single edge server 174 are shown in FIG. 1. In between the ingest server 172 and edge server 174, there may be several layers of servers (omitted from the illustrations), referred to as the middle tier. In one example, the edge server 174 may be multi-tenant, serving multiple content providers, such as telecommunication network 110, content providers associated with server (s) 149 in other network(s) 140, and so forth. In one example, edge server 174 may comprise an adaptive bitrate streaming video server.

As mentioned above, TV servers 112 in telecommunication network 110 may also include one or more interactive TV/video-on-demand (VoD) servers and/or network-based DVR servers. Among other things, an interactive TV/VoD server and/or network-based DVR server may function as a server for STB/DVR 162A and/or STB/DVR 162B, TV 163A and/or TV 163B, one or more of mobile devices 157A, 157B, 167A and 167B, and/or PC 166 operating as a client for requesting and receiving a manifest file for an adaptive bitrate streaming video, as described herein. For example, STB/DVR 162A may present a user interface and receive one or more inputs (e.g., via remote control 168A) for a selection of an adaptive bitrate streaming video. STB/DVR 162A may request the video from an interactive TV/VoD server and/or network-based DVR server, which may retrieve a manifest file for the video from one or more of the application servers 114 and provide the manifest file to STB/DVR 162A. STB/DVR 162A may then obtain video chunks of the video as identified in the manifest file.

In one example, the manifest file may direct the STB/ DVR 162A to obtain the video chunks from edge server 174 in CDN 170. The edge server 174 may already store the video chunks of the video and may deliver the video chunks upon a request from the STB/DVR 162A. However, if the edge server 174 does not already have the video chunks, upon receiving the request from the STB/DVR 162A, the edge server 174 may in turn request the video chunks from an origin server. The origin server which stores chunks of the video may comprise, for example, one of the servers 149 or one of the TV servers 112. The chunks of the video may be obtained from an origin server via ingest server 172 before being passed to the edge server 174. In one example, the ingest server 172 may also pass the video chunks to other middle tier servers and/or other edge servers (not shown) of CDN 170. The edge server 174 may then deliver the video chunks to the STB/DVR 162A and may store the video chunks until the video chunks are removed or overwritten from the edge server 174 according to any number of criteria, such as a least recently used (LRU) algorithm for determining which content to keep in the edge server 174 and which content to delete and/or overwrite.

It should be noted that a similar process may involve other devices, such as TV 163A or TV 163B (e.g., "smart" TVs), mobile devices 167A, 167B, 157A, or 157B obtaining a manifest file for a video from one of the TV servers 112, from one of the servers 149, etc., and requesting and obtaining video chunks of the video from the edge server 174 of CDN 170. In this regard, it should be noted that the edge server 174 may comprise a server that is closest to the requesting device geographically or in terms of network latency, throughput, etc., or which may have more spare capacity to serve the requesting device as compared to other edge servers, and so on. However, depending upon the location of the requesting device, the access network utilized by the requesting device, and other factors, the chunks of the video may be delivered via various networks, various links, and/or various intermediate devices. For instance, in one example, edge server 174 may deliver video chunks to a requesting device in the customer premises network 160 via access network 120, e.g., an ISP network. In another example, edge server 174 may deliver video chunks to a requesting device in the customer premises network 160 via telecommunication network 110 and access network 120. In still another example, edge server 174 may deliver video chunks to a requesting device such as mobile device 157A or 157B via telecommunication network 110 and wireless access network 150.

In accordance with the present disclosure, aspects of the system 100 may provide a test system (e.g., a processing system) for testing adaptive bitrate video streaming of non-annotated videos. For example, test controller 115 may coordinate measurement of performance indicators for non-annotated ABR videos via one or more test devices (e.g., mobile devices 157A, 157B, 167A, and 167B, TVs 163A and 163B, STB/DVR 162A, STB/DVR 162B, PC 166, etc.). For instance, to initialize a test device for testing regarding a particular non-annotated ABR video, test controller 115 may instruct the test device to download a reference copy of a video (e.g., a highest quality available track/variant of the video), to download and/or play all or at least a portion of a particular track, or variant (e.g., all or at least a portion of the chunks/segments of a track/variant), to screen record frames of the tracks/variants, to calculate image distances between respective screen captured frames of the different tracks/variants and respective corresponding frames of the reference copy having a same frame index, and/or to create downscaled versions of frames of the reference copy of the video.

In another example, test controller 115 may obtain the reference copy and different tracks/variants (e.g., all or at least a portion of the chunks/segments thereof), may screen capture frames of the tracks/variants, and may perform a frame-by-frame comparison of each frame of the reference copy of the video (e.g., the highest bitrate or encoding level track/variant available) to each corresponding screen captured frame (having the same frame number) from other variants. With this information, the test controller 115 may then create one or more look up tables (LUTs) identifying a respective distance (e.g., an average pixel distance) between each of the frames of the reference copy and the corresponding screen-captured frames of each of the variants. For instance, test controller 115 may perform this process directly, or may perform this process via another device that is the same as or similar to the test device (e.g., a same make and model of a smartphone, laptop computer, PC, or the like). The test controller 115 may then provide the one or more LUTs to the test device.

In any case, the test device may be instructed by the test controller 115 and/or may be configured to automatically perform a test run of streaming of a particular ABR video. In one example, the test controller 115 may also instruct the test device to apply a particular ABR switching logic to the downloading (e.g., where the ABR video player of the test device is modifiable/configurable in this way). For instance, a test device may be instructed to obtain only chunks/variants of a certain bitrate/encoding level, which could result in buffer depletion, video stalls/rebuffering, etc. if the bitrate level is higher than what the network distribution path(s) can support, whereas ABR switching logic designed to avoid video stalls/rebuffering might switch to a lower bitrate variant for various chunks to comply with the estimated network bandwidth and/or to maintain the buffer occupancy above a certain minimum level. However, in another example, a test device may be allowed to implement an ABR switching logic designed to provide a highest quality video possible while avoiding stalls, and the test device may obtain chunks from various variants for successive time blocks based upon the switching logic decisions. In other words, ABR switching logic of the test device may be allowed to operate without modification. For instance, the tester may be interested in the average video quality (VQ) over the entire video.

The videos being used for testing (e.g., the chunks/segments of various variants/tracks thereof) may be obtained by the test devices from various relevant sources, e.g., from TV servers 112, from CDN 170, and/or from servers 149, for example. In this regard, a plurality of different test paths 195-199 are illustrated in FIG. 1. For example, test path 195 may be for testing cellular-based streaming of a network provider video service, test path 196 may be for testing terrestrial-based streaming of a network provider video service, test path 197 may be for testing a terrestrial-based streaming of a $3^{rd}$ party video service via a CDN, test path 198 may be for testing a cellular-based streaming of a $3^{rd}$ party video service (without CDN distribution), test path 199 may be for testing a cellular-based streaming of a $3^{rd}$ party video service (with CDN distribution), and so on. Various other types of test paths may similarly be tested in accordance with the present disclosure. In one example, the test device may be instructed by test controller 115 to obtain video chunks from specific sources and/or via one or more specific test paths. In another example, the test device may select source(s) and/or test path(s) according to default player logic, e.g., selecting the closest servers, using multipath selection logic to choose cellular or non-cellular wireless paths, etc.

In one example, the test device performs screen-capture of video presented on the display screen of such device to obtain screen-captured images, or frames. The test device may then create downscaled versions of the screen-recorded frames (e.g., thumbnails) and perform frame alignment in accordance with downscaled versions of the frames of the reference copy of the video. In one example, the test device may then identify misaligned frames and/or stalls in video playback using a longest increasing subsequence procedure (e.g., as described in greater detail in connection with the example of FIG. 3 and/or as described elsewhere herein). In addition, in one example, the test device may perform track detection for the screen-captured frames by calculating an image distance between each screen-captured frame and a corresponding frame of the reference copy of the video having a same frame index, and then identifying the track to which the screen-captured frame belongs based upon a closest image distance of the image distances for the frames of the respective tracks/variants that were previously calculated.

Although the foregoing examples describe a test system and a scenario for testing of streaming of an non-annotated ABR video that includes test controller 115, it should be noted that in another example, the test device may perform such testing without any specific instructions from another device, such as test controller 115. In one example, test controller 115 may upload a test video, the variants, and/or the segments/chunks created therefrom to a third-party service (e.g., servers 149, CDN 170, etc.), which may store the segments/chunks in one or more locations, create a manifest file for the video, and make the manifest file available to various endpoint devices comprising ABR video players (such as test devices comprising mobile devices 157A, 157B, 167A, and 167B, TVs 163A and 163B, STB/DVR 162A, STB/DVR 162B, PC 166, etc.). Notably, the performance measures being targeted for testing of streaming of ABR video(s) may involve ABR streaming via third-party services (e.g., via CDN 170 and/or via servers 149) where the operator of telecommunication network 110 does not control the creation of the variants and chunks, or may involve ABR streaming where transcoders do not support the visual overlay of frame numbers and/or variant identifiers. Accordingly, test devices, such as mobile devices 157A, 157B, 167A, and 167B, TVs 163A and 163B, STB/DVR 162A, STB/DVR 162B, PC 166, etc. may be configured to perform various operations for testing adaptive bitrate video streaming of non-annotated videos, such as described in connection with the example method 400 of FIG. 4 and/or as described elsewhere herein.

As noted above, a test device may determine a variant/encoding level for each frame and/or for each segment/chunk, may determine any stalls and/or misaligned frames, and so forth. In other words, a test device may obtain various test metrics, or quality of experience (QoE) metrics, such as a track distribution, the stall frequency, the time(s) of the detected stall(s), stall durations, average stall durations, and so forth. For example, the rate switching metric may identify how often the variant/encoding level is switched over the course of the entire video, or a portion thereof for which the rate switching metric is being obtained. A rate switch may be determined from one or more subsequent received frames (e.g., from a first chunk) being found to have a different bitrate (or being of a different variant/encoding level) from one or more prior received frames (e.g., from a second chunk). In one example, the test device may further determine one or more other performance measures (or QoE measures), which may include a video quality (VQ), such as a spatial resolution, a frame rate, a compression artifacts measure, a pixel depth, etc., and delivery quality (DQ) measures, such as a video startup time, a video stall measure, a rate switching measure, a latency measure, a Video Multimethod Assessment Fusion (VMAF) metric, and so forth.

In one example, the test device may notify test controller 115 of any one or more of such metrics. For instance, the test device may send notifications comprising the variants/encoding levels that are determined for a plurality of screen recorded frames. The test controller 115 may store the received metrics (e.g., at test controller 115 or via another device or processing system, such as one or more of application servers 114), may calculate new metrics from the metrics or other data received from test devices, and so forth.

The performance measures may also be stored in association with information regarding other aspects of the test system relevant to the particular test, such as: the test device and its capabilities, the test path and/or characteristics of the test path (e.g., whether the test path includes a CDN or not, whether the test path is over a cellular or non-cellular wireless link or over a terrestrial link, whether the link is a fiber optic connection or a digital subscriber line (DSL) connection, a particular $3^{rd}$ party service from which the video is obtained, etc.), the ABR switching logic used by the ABR video player of the test device, whether multi-path streaming is used by the test device, and so on. In this regard, the test controller 115 and/or one or more test devices may tune aspects of the testing environment to observe variations in the performance measures, such as changing ABR video player rate-switching logic, forcing use of certain network paths, settings, and/or parameters for downloading of chunks/segments, and so on.

In addition, it should be noted that the system 100 may be implemented in a different form than that which is illustrated in FIG. 1, or may be expanded by including additional endpoint devices, access networks, network elements, application servers, etc. without altering the scope of the present disclosure. For example, telecommunication network 110 is not limited to an IMS network. Wireless access network 150 is not limited to a UMTS/UTRAN configuration. Similarly, the present disclosure is not limited to an IP/MPLS network for VoIP telephony services, or any particular type of broadcast television network for providing television services, and so forth.

In another example, functions described above in connection with a test device may be partially offloaded to one or more network-based devices. For example, application servers 114 may receive screen-captured images from test devices, may perform frame alignment of the screen capture images, may detect stalls and/or misaligned frames, may perform track detection (e.g., determining variants/encodings levels based upon image distances between screen-captured frames and corresponding frames of a reference copy having a same frame index), and so forth. In one example, these different operations may be coordinated by test controller 115. In addition, although test controller 115 is illustrated as a component of telecommunication network 110, in other examples, test controller 115 may be deployed in a different network, may be operated by a different entity, or both. For instance, test controller 115 may be deployed in one or more of the other networks 140 and may be used by a video streaming service to test and measure how ABR videos are delivered to video player devices.

Similarly, functions of a test device and/or test controller 115 may be shared among a plurality of devices in local communication (such as PC 166 and TV 163A). For instance, test controller 115 may utilize test devices such as TV 163A, TV 163B, mobile devices 167A and 167B, etc., while PC 166 may comprise a local device to coordinate with the test devices and to assemble the information obtained therefrom under the direction of test controller 115. To Illustrate, PC 166 may obtain from test controller 115 one or more lookup tables matching frame indexes and variants to corresponding image distances. PC 166 may also obtain from test controller 115 or from a content source (e.g., TV servers 112, CDN 170, servers 149, etc.) a reference copy of a test video. As such, TVs 163A and/or 163B may forward screen-captured frames to PC 166, which may calculate image distances, may cross-reference the image distances to image distances in lookup table(s) to determine frame indexes and to determine corresponding variants, and so on. In one example, PC 166 may be further configured to calculate one or more performance measures such as a video quality, e.g., a rate switching metric, to upload the determined bitrate variants/encoding levels and/or performance measures to test controller 115, and so on. In such an example, the test devices perform the screen capture, but are unburdened from having to obtain the reference copy of the video, perform frame alignment, detect stalls, calculate the variant/encoding levels by performing image distance calculations, and so on. In addition, in such an example, these functions are moved from a more centralized location (e.g., the test controller 115) to another device more local to the test device(s) (e.g., PC 116) which may be more efficient than uploading screen-captured images from the customer premises network 160 to the telecommunication network 110. Thus, these and other modifications are all contemplated within the scope of the present disclosure.

FIG. 4 illustrates a flowchart of an example method 400 for testing adaptive bitrate video streaming of non-annotated videos, in accordance with the present disclosure. In one example, the method 400 is performed by a test device/video player device, such as STB/DVR 162A, STB/DVR 162B, one of the TVs 163A or 163B, PC 166, one of the mobile devices 157A, 157B, 167A, or 167B, and so forth, or by a processing system comprising one or more of such devices in conjunction with one another and/or in conjunction with one or more other devices as illustrated in FIG. 1, such as test controller 115, application servers 114, TV servers 112, ingest server 172, edge server 174, one or more of servers 149, and so forth. In one example, the steps, functions, or operations of method 400 may be performed by a computing device or processing system, such as computing system 500, and/or hardware processor element 502 as described in connection with FIG. 5 below. For illustrative purposes, the method 400 is described in greater detail below in connection with an example performed by a processing system. The method 400 begins in step 405 and may proceed to one of optional steps 410-420 or to step 425.

At optional step 410, the processing system may obtain a reference copy of a video. In one example, the video may be an adaptive bitrate (ABR) streaming video for which a plurality of tracks/variants are available. In one example, the reference copy may be a copy of the highest quality available track/variant of the video. In one example, the reference copy of the video may be obtained from a content server (e.g., from a CDN, from one or more VoD servers, etc.). In another example, the reference copy of the video may be provided to the processing system at the same time or in connection with uploading of the video to an ABR streaming video distribution platform (which may the create variants of the video and make the variants available to client video player devices over one or more networks). In one example, the video may be a non-annotated video. In other words, there are no frame numbers overlaid or embedded within each frame (and no track/variant indictors provided on the respective frames of any of the tracks/variants).

At optional step 415, the processing system may obtain a plurality of recorded frames for at least a portion of the plurality of variants associated with the reference copy of the video. In one example, the processing system may be part of a video player device, and the plurality of recorded frames is obtained via a screen recording process of the video player device. For instance, the processing system may obtain a manifest file for the video which may identify where and/or how to obtain chunks/segments of different variants of the video (e.g., URLs which may be used to request and obtain such segments/chunks from various network-based servers, such as CDN server(s), VoD server(s), or the like). In one example, at least the portion of the plurality of variants may be for all or some of the variants (e.g., the portion could be less than all of the available variants). Alternatively, or in addition, at least the portion of the plurality of variants may comprise frames and/or chunks/segments of the variants for less than the entire video. For instance, the testing of the streaming of the ABR video via the method 400 may utilize sampling to obtain test metrics (e.g., QoE measures), without necessarily calculating the metrics over every frame of the entire video.

At optional step 420, the processing system may calculate image distances between the plurality of recorded frames of at least the portion of the plurality of variants and respective corresponding frames of the reference copy of the video having same frame indexes. In one example, an image distance is the sum of the absolute difference between each of the corresponding pixels within the respective images (e.g., between two frames). In one example, an image distance calculated at optional step 420 may comprise an average pixel distance between a recorded frame and a frame of the reference copy having the same frame number. In one example, an image distance may be based upon a representative sampling of pixels from within respective images (e.g., frames), in other words, less than all of the pixels. For example, an average pixel distance may be calculated in accordance with a first subset of pixels of a recorded frame and a second subset of pixels of a frame of the reference copy having the same frame number. Alternatively, or in addition, the average pixel distance may be computed in accordance with a reduced set of pixel features for the first subset of pixels of the recorded frame and the second subset of pixels of the frame of the reference copy having the same frame number (e.g., a translation of red, green, and blue pixel values to black/white representations for each of the pixel to be used for the calculating of the image distance).

In one example, optional step 420 may include performing a frame-by-frame comparison of each frame of the reference copy of the video (e.g., the highest bitrate or encoding level track/variant available) to each corresponding screen-captured frame (having the same frame number) from other variants to create one or more look up tables (LUTs) identifying a distance (e.g., an average pixel distance) between the frame of the reference copy and the corresponding screen-captured frames of each of the variants.

At step 425, the processing system obtains a downscaled version of the reference copy of the video (e.g., comprising a plurality of downscaled versions of a plurality of frames of the reference copy of the video). For example, the processing system may obtain the reference copy of the video at optional step 410 and may then create the downscaled version at step 425. In another example, a different device or system may create the downscaled version of the reference copy and may provide the downscaled version to the processing system for obtaining at step 425. In one example, the plurality of downscaled versions of the plurality of frames of the reference copy of the video may comprise thumbnail images. In various examples, step 425 may use different scaling algorithms, including nearest-neighbor-based sampling, bilinear sampling, bicubic sampling, sinc sampling, etc. In one example, there is no interframe encoding of the downscaled version, e.g., each downscaled frame may be self-contained and need not reference any other frame.

At step 430, the processing system obtains a first recorded frame of a first variant of a plurality of variants associated with the reference copy of the video, where the plurality of variants comprises a plurality of copies of the video encoded at different bitrates. In one example, the processing system may perform a screen recording in connection with ABR streaming of the video. For instance, the processing system may be of a video player device, where the first recorded frame is obtained via a screen recording process of the video player device. In another example, the processing system may obtain the screen-recorded frame(s) from another device or process.

It should also be noted that although the terms, "first," "second," "third," etc., may be used herein, the use of these terms is intended as labels only. Thus, the use of a term such as "third" in one example does not necessarily imply that the example must in every case include a "first" and/or a "second" of a similar item. In other words, the use of the terms "first," "second," "third," and "fourth," does not imply a particular number of those items corresponding to those numerical values. In addition, the use of the term "third" for example, does not imply a specific sequence or temporal relationship with respect to a "first" and/or a "second" of a particular type of item, unless otherwise indicated. Similarly, as referred to herein, the term "first" is used simply as a label and does not imply that a frame, a segment, etc. necessarily relates to a beginning of the video, the initial segment of a video, etc. (although in one example it could be).

At step 435, the processing system generates a first downscaled version of the first recorded frame. For instance, the first downscaled version of the first recorded frame may comprise a thumbnail image, and may be generated using any of the downscaling algorithms mentioned above (or any other that is available).

At step 440, the processing system calculates a first plurality of image distances between the first downscaled version of the first recorded frame and the plurality of downscaled versions of the plurality of frames of the reference copy of the video. For instance, the image distances may comprise average pixel distances between the first downscaled version of the first recorded frame and downscaled versions of frames of the reference copy. In one example, the image distances may be based upon a representative sampling of pixels from within respective frames being compared and/or may be computed in accordance with a reduced set of pixel features of the respective frames.

At step 445, the processing system determines a first frame index of the first recorded frame in accordance with a (first) least image distance from among the first plurality of image distances that are calculated. For instance, the first downscaled version of the first recorded frame may be most similar to a downscaled version of the frame of the reference copy having a same frame index. In other words, the frame of the reference copy having the (first) least image distance may be determined to contain the same visual information (since the first recorded frame and the frame of the reference copy correspond to the same portion of the video and were ultimately derived from a same source frame).

At optional step 450, the processing system may determine whether there are more recorded frames to process. If there are no more recorded frames to process, the method 400 may proceed to optional step 455, to optional step 465, or to step 495. On the other hand, if there are more recorded frames to process, the method 400 may return to step 430. For example, the processing system may repeat steps 430-445 for a second recorded frame, a third recorded frame, etc. (e.g., obtaining the second recorded frame (which may be of the first variant or a second variant of the plurality of variants associated with the reference copy of the video), generating a second downscaled version of the second recorded frame, calculating a second plurality of image distances between the second downscaled version of the second recorded frame and the plurality of downscaled versions of the plurality of frames of the reference copy of the video, and determining a second frame index of the second recorded frame in accordance with a second least image distance from among the second plurality of image distances that are calculated). It should be noted that through one or more repetitions of the steps 430-445, the processing system may determine a plurality of frame indexes of a sequence of recorded frames including at least the first frame.

At optional step 455, the processing system may extract a longest increasing subsequence from the sequence of recorded frames in accordance with the plurality of frame indexes. For example, as noted above, one or more repetitions of the steps 430-445 may result in the processing system obtaining a plurality of frame indexes of a sequence of recorded frames including at least the first frame. At optional step 455, the processing system may then apply an algorithm or process to extract the longest increasing subsequence from the sequence of recorded frames. The extraction algorithm or process may use any technique which is capable of determining the longest increasing subsequence. For instance, an efficient longest increasing subsequence algorithm may solve the extraction problem with O(N log N) time complexity.

At optional step 460, the processing system may detect a stall in accordance with the longest increasing subsequence. For instance, in one example, optional step 460 may comprise assigning a recorded index to each recorded frame of the sequence of recorded frames, determining a first index offset for one recorded frame of the longest increasing subsequence, the first index offset comprising a difference between the recorded index for the one recorded frame and a frame index for the one recorded frame, determining a second index offset for a next recorded frame of the longest increasing subsequence after the one recorded frame, the second index offset comprising a difference between the recorded index for the next recorded frame and a frame index for the next recorded frame, and determining an occurrence of the stall when the second index offset is greater than the first index offset.

It should be noted that the in one example, optional step 460 may include calculating an index offset for each recorded frame in the longest increasing subsequence and comparing to an index offset for a preceding recorded frame in the longest increasing subsequence. In this way, one or more stalls (or no stalls) may be detected in the longest increasing subsequence. In one example, the occurrence of the stall is determined when the second index offset is greater than the first index offset by at least 10 frames. For instance, it may be possible that a stall may be misdetected via the above procedure. However, since even short stalls that may be correctly detected may not affect user experience, these short detected stalls may not be counted as an actual stall. For instance, stalls less than 500 ms, less than 410 ms, etc. may not be noticed by users and therefore may not affect a QoE. It should also be noted that a frame misdetection (without stall) may be identified when there is a gap in the recorded indexes of two sequential recorded frames of the longest increasing subsequence and no change between index offsets of the two sequential recorded frames.

In another example, optional step 460 may comprise identifying an excluded subsequence comprising at least one recorded frame of the sequence of recorded frames that is excluded from the longest increasing subsequence, determining a length of the excluded subsequence, and calculating a difference in frame indexes of a first frame of the sequence of recorded frames that precedes the excluded subsequence and a second frame of the sequence of recorded frames that precedes the excluded subsequence. The processing system may then determine an occurrence of a stall (which may also include one or more misdetected frames) when the length of the excluded subsequence is greater than or equal to the difference in the frame indexes between the first frame of the sequence of recorded frames that precedes the excluded subsequence and the second frame of the sequence of recorded frames that precedes the excluded subsequence. In addition, in one example, the occurrence of the stall may be determined when the length of the excluded subsequence is greater than or equal to the difference in frame indexes and the length of the excluded subsequence is at least 10 frames. For instance, it may be possible that an excluded subsequence indicative of a stall may be a misdetected stall. However, since even short stalls that may be correctly detected may not affect user experience, these short excluded subsequences may not be counted as an actual stall.

In one example, the excluded subsequence may instead be determined to comprise a frame misdetection (without stall)

when the length of the excluded subsequence is less than the difference in frame indexes between the first frame of the sequence of recorded frames that precedes the excluded subsequence and the second frame of the sequence of recorded frames that precedes the excluded subsequence. It should be noted that the processing system may identify this as a misdetection of one or more frames, but it is possible that the frame is correctly identified, but there was a video player error where the video player played a frame out of order, without necessarily resulting in a stall. After optional step 460, the method 400 may proceed to step 495 or to optional step 465.

At optional step 465, the processing system may calculate a first image distance between the first recorded frame and a first frame of the reference copy having the first frame index, e.g., a sum of the absolute difference between each of the corresponding pixels within the respective images, an average pixel distance, etc. In one example, the first image distance may be based upon a representative sampling of pixels and/or a reduced set of pixel features.

At optional step 470, the processing system may determine a variant of the first recorded frame in accordance with a closest match between the first image distance and one of the image distances for recorded frames of at least the portion of the plurality of variants having the first frame index. For example, the processing system may refer to one or more look up tables (LUTs) identifying a distance (e.g., an average pixel distance) between the frame of the reference copy and the corresponding screen-captured frames of each of the variants. For instance, one or more LUTs may have been generated in accordance with optional step 420 and/or may have been provided to the processing system for use in connection with performing the method 400. The image distance in the LUT for the frame index that is closest to the first image distance may then identify the associated variant of the first recorded frame.

At optional step 475, the processing system may determine whether there are more recorded frames to process. If there are no more recorded frames to process, the method 400 may proceed to optional step 480 or to step 495. On the other hand, if there are more recorded frames to process, the method 400 may return to optional step 465. For example, the processing system may repeat optional steps 465 and 470 for a second recorded frame, a third recorded frame, etc. (e.g., calculating a second image distance between a second recorded frame that is determined to have a second frame index and a second frame of the reference copy having the second frame index, and determining a variant of the second recorded frame in accordance with a closest match between the second image distance and one of the image distances for recorded frames of at least the portion of the plurality of variants having the second frame index).

At optional step 480, the processing system may identify a variant for a segment comprising a plurality of recorded frames in accordance with a majority of variants that are determined for the plurality of recorded frames comprising the segment. For instance, the plurality of recorded frames may include at least the first recorded frame and the second recorded frame. Notably, since track switches typically occur at the segment boundaries, for frames within each segment (which can be a few seconds long) the track/variant should be the same. Thus in one example, the present disclosure may aggregate the calculated tracks/variants for each frame within a segment, find the most frequent result, and set this as the result for the segment (and/or all frames within the segment).

In one example, optional step 480 may also include obtaining a track/variant distribution in accordance with at least the variant for the segment that is identified. For instance, the processing system may determine variants for a plurality of segments/chunks that are presented via the processing system and that are screen-recorded. The track/variant distribution may then provide a useful QoE metric to characterize the ABR streaming of this particular video under the player/test device's conditions, settings, location, etc., under the particular network conditions, and so forth.

Following step 445 or any of the optional steps 450-480, the method 400 may proceed to step 495 where the method ends.

It should be noted that the method 400 may be expanded to include additional steps, or may be modified to replace steps with different steps, to combine steps, to omit steps, to perform steps in a different order, and so forth. For instance, in one example the processor may repeat one or more steps of the method 400 by obtaining additional recorded frames, determining frame indexes, detecting stalls, determining tracks/variants of the recorded frames, and so on. In one example, obtaining the first recorded frame and the second recorded frame via step 430 may include recording a sequence of recorded frames (e.g., screen recording) from a plurality of presented frames, and adjusting the sequence of recorded frames to a same frame rate as the reference copy of the video. In this regard, it should be noted that while the method 400 is described above where steps 430-445 are sequential with respect to first and second recorded frames, in other examples, multiple screen recorded-frames may be obtained prior to generating downscaled versions, calculating image distances to the plurality of downscaled versions of the reference copy of the video, and determining respective frame indexes of the multiple screen-recorded frames. In another example, multiple player devices may be arranged in parallel to obtain ABR video streams of the same video, but may use different ABR logic, may use different access networks and/or may obtain the frames/video chunks from different content servers and/or video service providers (e.g., different test paths), and so on.

In still another example, the method 400 may additionally include generating a report comprising one or more test metrics (e.g., QoE measures), such as a number or percentage of stalls, the average stall duration, the locations within the video where stall(s) occurred, a track distribution metric, and so forth. For instance, the report may be provided to one or more computing devices associated with telecommunication network operators, CDN operators, video content creators, video content providers, and so forth. In one example, the report may be provided to one or more automated processing systems, such as a software defined network (SDN) controller which may use the information to adjust the configuration of a telecommunication network, such as instantiating or winding down one or more content servers, allocating additional link bandwidth to video streaming, and so on. Similarly, the report may be provided to a CDN orchestrator to instantiate or wind-down one or more nodes (e.g., ingest servers, edge servers, or the like), to allocate additional storage resources to one or more nodes of the CDN, and so on. In another example, the report may be provided to one or more servers comprising transcoders and/or packagers to adjust the target bitrates/encoding levels for the different bitrate variants for the same video and/or one or more additional videos, to use more or less variants, and so forth. In still another example, the report may be provided to one or more servers which may automatically adjust ABR player logic in accordance with the test metric(s).

Thus, these and other modifications are all contemplated within the scope of the present disclosure.

In addition, although not expressly specified above, one or more steps of the method 400 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 4 that recite a determining operation or involve a decision do not necessarily require that both branches of the determining operation be practiced. In other words, one of the branches of the determining operation can be deemed as an optional step. In addition, one or more steps, blocks, functions, or operations of the above described method 400 may comprise optional steps, or can be combined, separated, and/or performed in a different order from that described above, without departing from the example embodiments of the present disclosure. Thus, the use of the term "optional step" is intended to only reflect different variations of a particular illustrative embodiment and is not intended to indicate that steps not labelled as optional steps to be deemed to be essential steps. The method 400 may also be expanded to include additional steps. Thus, these and other modifications are all contemplated within the scope of the present disclosure.

Figure 5:
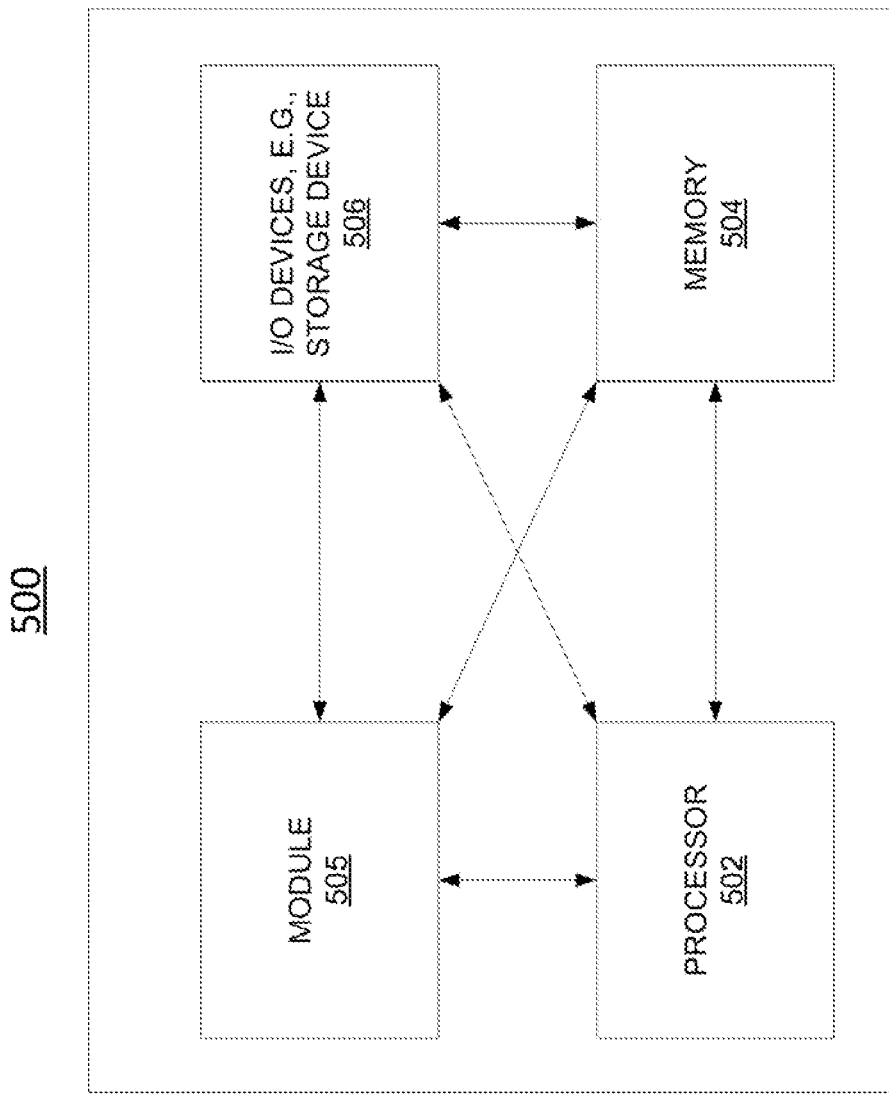
FIG. 5 illustrates a high level block diagram of a computing system specifically programmed to perform the steps, functions, blocks and/or operations described herein.

FIG. 5 depicts a high-level block diagram of a computing system 500 (e.g., a computing device or processing system) specifically programmed to perform the functions described herein. For example, any one or more components or devices illustrated in FIG. 1 or described in connection with the method 400 of FIG. 4, may be implemented as the computing system 500. As depicted in FIG. 5, the computing system 500 comprises a hardware processor element 502 (e.g., comprising one or more hardware processors, which may include one or more microprocessor(s), one or more central processing units (CPUs), and/or the like, where the hardware processor element 502 may also represent one example of a "processing system" as referred to herein), a memory 504, (e.g., random access memory (RAM), read only memory (ROM), a disk drive, an optical drive, a magnetic drive, and/or a Universal Serial Bus (USB) drive), a module 505 for testing adaptive bitrate video streaming of non-annotated videos, and various input/output devices 506, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one hardware processor element 502 is shown, the computing system 500 may employ a plurality of hardware processor elements. Furthermore, although only one computing device is shown in FIG. 5, if the method(s) as discussed above is implemented in a distributed or parallel manner for a particular illustrative example, e.g., the steps of the above method(s) or the entire method(s) are implemented across multiple or parallel computing devices, then the computing system 500 of FIG. 5 may represent each of those multiple or parallel computing devices. Furthermore, one or more hardware processor elements (e.g., hardware processor element 502) can be utilized in supporting a virtualized or shared computing environment. The virtualized computing environment may support one or more virtual machines which may be configured to operate as computers, servers, or other computing devices. In such virtualized virtual machines, hardware components such as hardware processors and computer-readable storage devices may be virtualized or logically represented. The hardware processor element 502 can also be configured or programmed to cause other devices to perform one or more operations as discussed above. In other words, the hardware processor element 502 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer-readable instructions pertaining to the method(s) discussed above can be used to configure one or more hardware processor elements to perform the steps, functions and/or operations of the above disclosed method(s). In one example, instructions and data for the present module 505 for testing adaptive bitrate video streaming of non-annotated videos (e.g., a software program comprising computer-executable instructions) can be loaded into memory 504 and executed by hardware processor element 502 to implement the steps, functions or operations as discussed above in connection with the example method 400. Furthermore, when a hardware processor element executes instructions to perform operations, this could include the hardware processor element performing the operations directly and/or facilitating, directing, or cooperating with one or more additional hardware devices or components (e.g., a co-processor and the like) to perform the operations.

The processor (e.g., hardware processor element 502) executing the computer-readable instructions relating to the above described method(s) can be perceived as a programmed processor or a specialized processor. As such, the present module 505 for testing adaptive bitrate video streaming of non-annotated videos (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium may comprise a physical device, a hardware device, or a device that is discernible by the touch. More specifically, the computer-readable storage device or medium may comprise any physical devices that provide the ability to store information such as instructions and/or data to be accessed by a processor or a computing device such as a computer or an application server.

While various examples have been described above, it should be understood that they have been presented by way of example only, and not limitation. Thus, the breadth and scope of a preferred example should not be limited by any of the above-described examples, but should be defined only in accordance with the following claims and their equivalents.

What is claimed is:
1. A method comprising:
obtaining, by a processing system including at least one processor, a scaled version of a reference copy of a video, comprising a plurality of scaled versions of a plurality of frames of the reference copy of the video;

obtaining, by the processing system, a first recorded frame of a first variant of a plurality of variants associated with the reference copy of the video, wherein the plurality of variants comprises a plurality of copies of the video encoded at different bitrates;

generating, by the processing system, a first scaled version of the first recorded frame;

calculating, by the processing system, a first plurality of image distances between the first scaled version of the first recorded frame and the plurality of scaled versions of the plurality of frames of the reference copy of the video;

determining, by the processing system, a first frame index of the first recorded frame in accordance with a first least image distance from among the first plurality of image distances that is calculated;

determining, by the processing system, a plurality of frame indexes of a sequence of recorded frames including the first recorded frame;

extracting, by the processing system, a longest increasing subsequence from the sequence of recorded frames in accordance with the plurality of frame indexes; and detecting, by the processing system, a stall in accordance with the longest increasing subsequence, wherein the detecting the stall comprises:

identifying an excluded subsequence comprising at least one recorded frame of the sequence of recorded frames that is excluded from the longest increasing subsequence;

determining a length of the excluded subsequence;

calculating a difference in frame indexes of a first frame of the sequence of recorded frames that precedes the excluded subsequence and a second frame of the sequence of recorded frames that precedes the excluded subsequence; and determining an occurrence of the stall when the length of the excluded subsequence is greater than or equal to the difference in frame indexes.

2. The method of claim 1, wherein the processing system is a part of a video player device, wherein the first recorded frame is obtained via a screen-recording process of the video player device.

3. The method of claim 1, wherein the first scaled version of the first recorded frame and the plurality of scaled versions of the plurality of frames of the reference copy of the video comprise thumbnail images.

4. The method of claim 1, further comprising:

obtaining, by the processing system, a second recorded frame of the first variant or a second variant of the plurality of variants associated with the reference copy of the video;

generating, by the processing system, a second scaled version of the second recorded frame;

calculating, by the processing system, a second plurality of image distances between the second scaled version of the second recorded frame and the plurality of scaled versions of the plurality of frames of the reference copy of the video; and determining, by the processing system, a second frame index of the second recorded frame in accordance with a second least image distance from among the second plurality of image distances that is calculated.

5. The method of claim 1, wherein the occurrence of the stall is determined when the length of the excluded subsequence is greater than or equal to the difference in frame indexes and the length of the excluded subsequence is at least 10 frames.

6. The method of claim 1, wherein the excluded subsequence is determined to comprise a frame misdetection when the length of the excluded subsequence is less than the difference in frame indexes.

7. The method of claim 1, further comprising:
obtaining the reference copy of the video.

8. The method of claim 7, further comprising:

obtaining a plurality of recorded frames for at least a portion of the plurality of variants associated with the reference copy of the video; and calculating image distances between the plurality of recorded frames of the at least the portion of the plurality of variants and respective corresponding frames of the reference copy of the video having same frame indexes.

9. The method of claim 8, further comprising:

calculating a first image distance between the first recorded frame and a first frame of the reference copy having the first frame index; and determining a variant of the first recorded frame in accordance with a closest match between the first image distance and one of the image distances for recorded frames of the at least the portion of the plurality of variants having the first frame index.

10. The method of claim 9, further comprising:

calculating a second image distance between a second recorded frame that is determined to have a second frame index and a second frame of the reference copy having the second frame index; and determining a variant of the second recorded frame in accordance with a closest match between the second image distance and one of the image distances for recorded frames of the at least the portion of the plurality of variants having the second frame index.

11. The method of claim 10, further comprising:

identifying a variant for a segment comprising a plurality of recorded frames in accordance with a majority of variants that are determined for the plurality of recorded frames comprising the segment, wherein the plurality of recorded frames includes at least the first recorded frame and the second recorded frame.

12. The method of claim 11, wherein the identifying the variant for the segment includes:

obtaining a track distribution in accordance with at least the variant for the segment that is identified.

13. A non-transitory computer-readable medium storing instructions which, when executed by a processing system including at least one processor, cause the processing system to perform operations, the operations comprising:

obtaining a scaled version of a reference copy of a video, comprising a plurality of scaled versions of a plurality of frames of the reference copy of the video;

obtaining a first recorded frame of a first variant of a plurality of variants associated with the reference copy of the video, wherein the plurality of variants comprises a plurality of copies of the video encoded at different bitrates;

generating a first scaled version of the first recorded frame;

calculating a first plurality of image distances between the first scaled version of the first recorded frame and the plurality of scaled versions of the plurality of frames of the reference copy of the video;

determining a first frame index of the first recorded frame in accordance with a first least image distance from among the first plurality of image distances that is calculated;

determining a plurality of frame indexes of a sequence of recorded frames including the first recorded frame;
extracting a longest increasing subsequence from the sequence of recorded frames in accordance with the plurality of frame indexes; and
detecting a stall in accordance with the longest increasing subsequence, wherein the detecting the stall comprises:
identifying an excluded subsequence comprising at least one recorded frame of the sequence of recorded frames that is excluded from the longest increasing subsequence;
determining a length of the excluded subsequence;
calculating a difference in frame indexes of a first frame of the sequence of recorded frames that precedes the excluded subsequence and a second frame of the sequence of recorded frames that precedes the excluded subsequence; and
determining an occurrence of the stall when the length of the excluded subsequence is greater than or equal to the difference in frame indexes.

14. A device comprising:
a processing system including at least one processor; and
a computer-readable medium storing instructions which, when executed by the processing system, cause the processing system to perform operations, the operations comprising:
obtaining a scaled version of a reference copy of a video, comprising a plurality of scaled versions of a plurality of frames of the reference copy of the video;
obtaining a first recorded frame of a first variant of a plurality of variants associated with the reference copy of the video, wherein the plurality of variants comprises a plurality of copies of the video encoded at different bitrates;
generating a first scaled version of the first recorded frame;
calculating a first plurality of image distances between the first scaled version of the first recorded frame and the plurality of scaled versions of the plurality of frames of the reference copy of the video;
determining a first frame index of the first recorded frame in accordance with a first least image distance from among the first plurality of image distances that is calculated;
determining a plurality of frame indexes of a sequence of recorded frames including the first recorded frame;
extracting a longest increasing subsequence from the sequence of recorded frames in accordance with the plurality of frame indexes; and
detecting a stall in accordance with the longest increasing subsequence, wherein the detecting the stall comprises:
identifying an excluded subsequence comprising at least one recorded frame of the sequence of recorded frames that is excluded from the longest increasing subsequence;
determining a length of the excluded subsequence;
calculating a difference in frame indexes of a first frame of the sequence of recorded frames that precedes the excluded subsequence and a second frame of the sequence of recorded frames that precedes the excluded subsequence; and
determining an occurrence of the stall when the length of the excluded subsequence is greater than or equal to the difference in frame indexes.

15. The device of claim 14, wherein the processing system is a part of a video player device, wherein the first recorded frame is obtained via a screen-recording process of the video player device.

16. The device of claim 14, wherein the first scaled version of the first recorded frame and the plurality of scaled versions of the plurality of frames of the reference copy of the video comprise thumbnail images.

17. The device of claim 14, wherein the operations further comprise:
obtaining a second recorded frame of the first variant or a second variant of the plurality of variants associated with the reference copy of the video;
generating a second scaled version of the second recorded frame;
calculating a second plurality of image distances between the second scaled version of the second recorded frame and the plurality of scaled versions of the plurality of frames of the reference copy of the video; and
determining a second frame index of the second recorded frame in accordance with a second least image distance from among the second plurality of image distances that is calculated.

18. The device of claim 14, wherein the occurrence of the stall is determined when the length of the excluded subsequence is greater than or equal to the difference in frame indexes and the length of the excluded subsequence is at least 10 frames.

19. The device of claim 14, wherein the excluded subsequence is determined to comprise a frame misdetection when the length of the excluded subsequence is less than the difference in frame indexes.

20. The device of claim 14, wherein the operations further comprise:
obtaining the reference copy of the video.

* * * * *